United States Patent [19]

Tharp et al.

[11] 4,068,364

[45] Jan. 17, 1978

[54] RESLEEVING TOOL

[76] Inventors: Gordon H. Tharp, 8910 Sunset Drive, Wonder Lake, Ill. 60097; Herman Dorland, 2850-F W. Touhy, Chicago, Ill. 60645

[21] Appl. No.: 649,506

[22] Filed: Jan. 15, 1976

[51] Int. Cl.$^{2}$ ............................................ B23P 19/02

[52] U.S. Cl. ................................................. 29/235

[58] Field of Search ...................... 29/235, 268, 239; 81/302, 72; 269/268; 294/97, 28, 13

[56] References Cited

U.S. PATENT DOCUMENTS

| | | | |
|---|---|---|---|
| 1,810,631 | 6/1931 | Trump | 29/235 |
| 2,561,196 | 7/1951 | Gauthier | 269/238 |
| 2,715,346 | 8/1955 | Thomas | 81/72 |
| 2,844,146 | 7/1958 | Perdue | 29/235 |
| 3,363,303 | 1/1968 | Hodgson et al. | 29/235 |
| 3,916,907 | 11/1975 | Peterson | 81/302 |

*Primary Examiner*—James L. Jones, Jr.
*Attorney, Agent, or Firm*—Jr. Rogers

[57] ABSTRACT

A tool for inserting an elastic sleeve on a shaft which consists of two independent semicircular members adapted to be used in edge-to-edge relationship which are tapered toward one end and have pivot points at the bases of the taper such that the tapered ends can be inserted into the sleeve and the ends then spread to stretch the sleeve, the tube defined by the semicircular members together being bigger than the shaft such that the tool with the stretched sleeve end can be drawn down over the shaft to attach the sleeve to it.

7 Claims, 8 Drawing Figures

Fig. 2.
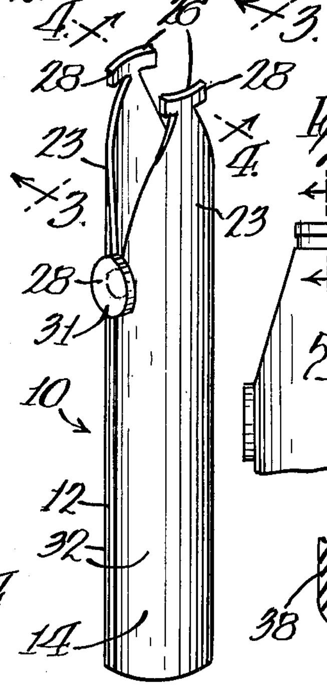
Fig. 7.
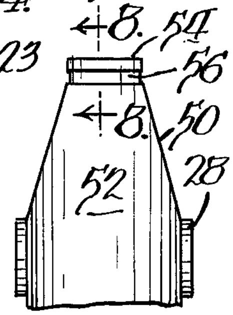
Fig. 4.
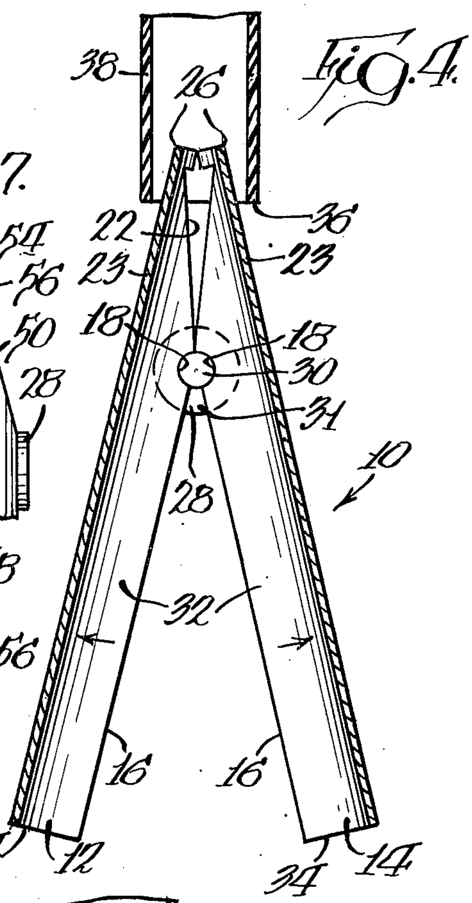
Fig. 1.
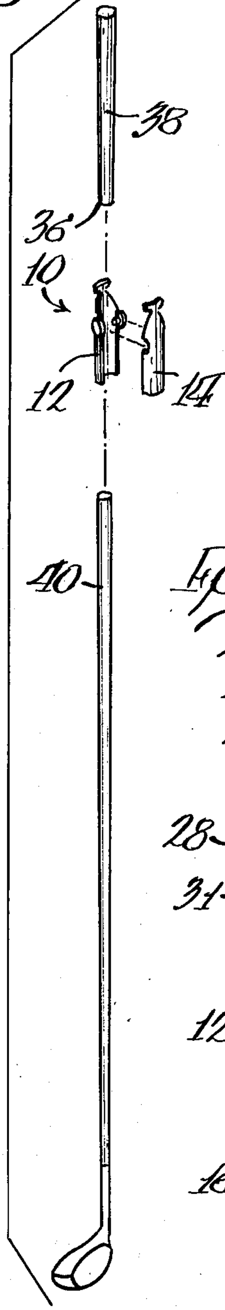
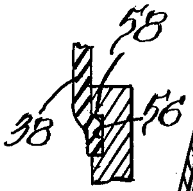
Fig. 8.
Fig. 3.
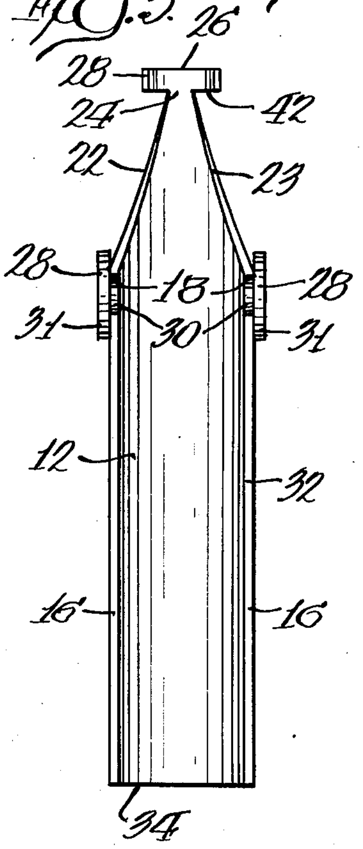
Fig. 5.
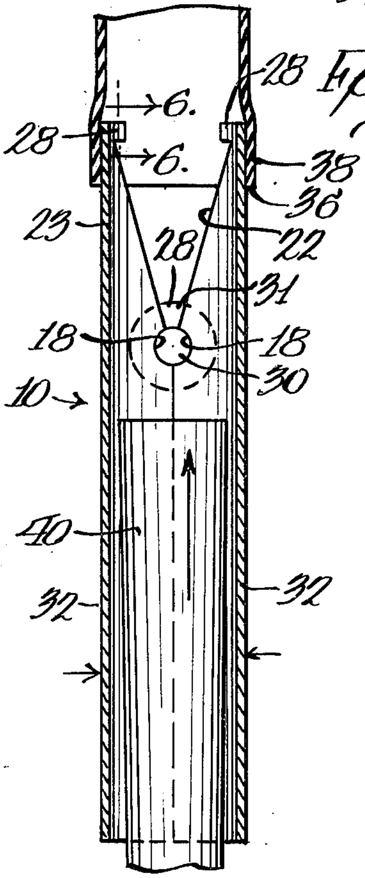
Fig. 6.
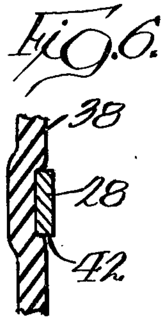

RESLEEVING TOOL

BACKGROUND OF THE INVENTION

The present invention was devised for the purpose of replacing grips on golf clubs, although its applicability extends to any comparable situation.

Replacement grips for gold clubs commonly are of rubber and are molded to be slightly smaller in inside diameter than the golf club shaft to which they are to be applied. To complicate the matter further, gold club shafts are commonly tapered with a larger diameter at the free end of the shaft so that the smallest diameter of the grip must be initially drawn over the largest diameter portion of the shaft.

To resleeve a golf club shaft, the practice is to wind the shaft with a double coated adhesive paper, wet the adhesive on the exterior of the paper with an organic solvent to make it slippery, laboriously work the small end of the grip over the large end of the shaft, and, by pushing down on the sleeve, twisting, and working the sleeve with a slipping manual action, eventually emplace the sleeve at the desired position on the shaft. Obviously, if the lower end of the sleeve could be grasped and spread to encompass the large end of the shaft, and drawing or tractive effort applied along with pushing or propulsive effort to slide the sleeve into its proper position, the procedure would be greatly facilitated.

U.S. Pat. No. 3,233,313 to Roth dated Feb. 8, 1966 illustrates a device directed to somewhat the same purpose as the present invention. Roth shows a tonglike structure with a riveted or bolted pivot point and semicircular jaws with upstanding flanges adapted to fit into a sleeve when together and to spread the sleeve by a scissors action to fit the sleeve over a shaft, the spread gap of the jaws being sufficient to encompass the shaft.

The difficulty with the Roth device in comparison with the tool of the present invention is that it is considerably more expensive, and it is poorly adapted to the application of tractive effort. The effort is offset to the side of the shaft rather than concentrically therewith which, obviously, is the most efficient axis of effort application.

A somewhat similar device is shown in U.S. Pat. No. 544,268 to Unsinger et al. dated Aug. 6, 1895.

SUMMARY OF THE INVENTION

The device of the present invention consists of two similar channel-shaped members adapted to be placed in edge-to-edge relation to define a tube having an inside diameter larger than the shaft to which the sleeve is to be applied. At one end of the members, the sides taper toward the back of the channels to define a tip on each member, and the intersection of the tapers and the long edges defines a transverse axis of rocking or pivotal movement. A bearing and notch arrangement is provided at this intersection which maintains the two members in a fixed longitudinal and lateral position with respect to each other. The members are rocked on the pivoting axis to bring the tips together to permit their insertion into the sleeve. They are then rocked back to spread the end of the sleeve and bring the long edges together whereby the tube is reconstituted. The tube carrying the spread end of the sleeve is then inserted over the shaft and the sleeve is drawn downwardly by the device to emplace it on the shaft.

A re-entrant surface is desirably provided on the tips to effect a more positive, grasping engagement with the interior of the sleeve.

By virtue of the concentric enclosure of the shaft by the tool, strong pressure can be exerted on the tool without off-axis torque moments as in the case of the Roth patent above, and this pressure can be exerted with one hand, enabling the other hand to assist in feeding the sleeve onto the shaft or in steadying the shaft.

The tool in its simplest and preferred form is notably inexpensive in that it may consist of a longitudinally split section of pipe, each half of which is simply and easily machined, and incorporates only two very simple additions.

BRIEF DESCRIPTION OF THE DRAWINGS

FIG. 1 is an exploded perspective view of a golf club, a handle therefor and the tool of the present invention in the general arrangement for handle application;

FIG. 2 is a perspective of the tool of FIG. 1;

FIG. 3 is an inside elevation of one of the halves of the tool as seen from the line 3—3 of FIG. 2 looking in the direction of the arrows;

FIG. 4 is a central section through the two halves of the tool taken along the line 4—4 of FIG. 2 looking in the direction of the arrows and a fragmentary golf club grip, showing the tool in collapsed position;

FIG. 5 is a view similar to FIG. 4 showing the tool yin expanded condition in relation to a golf club shaft;

FIG. 6 is a section taken along the lines 6—6 of FIG. 5 looking in the direction of the arrows;

FIG. 7 is an outside elevation of the tip of a modification of the tool; and FIG. 8 is a section taken along the line 8—8 of FIG. 7 looking in the direction of the arrows.

DESCRIPTION OF A PREFERRED EMBODIMENT

The resleeving tool 10 of the present invention, as illustrated, consists of a length of one inch pipe or tubing about $6\frac{1}{2}$ inches long longitudinally divided into two semicircular channel sections 12 and 14 having longitudinal edges 16. At a point about two-thirds of their length or about $4\frac{5}{8}$ inches from the remote end, semicircular notches 18 are formed in the edges 16. From the imaginary center of the notches 18, that portion of the long edges 16 from the notches to the closer pipe section ends are ground away on a slope as at 22 to progressively reduce the arc of the pipe section and hence both the channel wall and channel back to define a tip section 23. The slope or bevel 22 progresses to a neck 24 about a quarter of an inch wide, an eighth of an inch short of the end of the section, and the tool terminates in a tip 26 having lobes 28 extending laterally therefrom. The lobes are integral portions of the pipe wall formed by the grinding. With the lobes, the tip is about one-half inch wide.

To complete the tool, shallow, headed studs 28 having shanks 30 equal in diameter to the semicircular notches 18 and in length to the wall thickness of the channel sections 12 and 14 and larger heads 31 are welded or brazed to one 12 of the pipe sections with the shanks 30 occupying the notches 18 of that section and the heads 31 outside the section extending generally parallel to each other and beyond the longitudinal edges 16.

The use of the tool will be evident. The two sections will be mounted together as illustrated in FIG. 2 with the semicircular notches 18 of section 14 engaged on the stud shanks 30 welded to the section 12. Thus the sections 12 and 14 can rock relative to each other about the shanks 30 as an axis. The handle portion 32 of the sections, that portion between the pivot 30 and the remote end 34 of the sections, are spread on the pivot 30 to bring the tips 26 together and the tips inserted in the open end 36 of the sleeve or golf club grip 38 as shown in FIG. 4. It may be necessary to flatten the sleeve slightly to accommodate the width of the relatively wide lobed tips 26. Squeezing the handle portions 32 together will then serve to stretch the sleeve end 36, and the tool itself constitutes a leading tube engageable over the golf club shaft 40 supporting the leading end 36 of the sleeve in a spaced relation from the golf club shaft as the tool draws the sleeve 38 down over the shaft 40.

It will be noted that the application of tractive effort is concentric with the shaft, and thus lends itself to a one hand manipulation such that the other hand can be employed to insure the following of the sleeve with the tool.

The lobed tip 26 achieves a dual function. First, it holds the sleeve wide across the tip while stretching it on the transverse axis to facilitate emplacement over the end of the shaft. Second, the resilience of the sleeve will cause it to snag over the re-entrant, inside lobe surface 42 adjacent the neck 24 to provide a relatively positive engagement with the sleeve to insure a firmer grasp thereof, as particularly illustrated in FIG. 6.

When the sleeve has been fully emplaced on the shaft, the tool sections will be separated by movement of the handle portions 32 away from each other to the point of disengagement at the pivots 30 and the sections then individually worked out from under the sleeve.

The pivot engagement between the notches 18 of section 14 and stud shanks 30 of section 12 prevent longitudinal displacement of the tool halves with respect to each other and the stud heads 31 of section 12, embracing section 14, prevent lateral relative displacement.

Many variations of the device as described above are readily conceivable. One such variation is shown in FIG. 7. Here, the slope 50 of the tip portion 52 of the sections is at less of an angle than that illustrated in the first described embodiment and extends straight to the extremity 54 of the tip. In this modification, the tip 54 should have the same width of one-half inch as in the first described embodiment in order, again, to achieve the lateral spreading of the sleeve. To provide the re-entrant surface to effect the relatively positive engagement of the sleeve 38 with the tip, a channel 56 is cut transversely across the outside surface of the tip portion 52 closely inside the extremity 54 thereof. As particularly shown in FIG. 8, the elasticity of the sleeve will cause the end thereof to sink within the groove 56 and engage against the remote wall 58 thereof.

Other structural alternatives will readily suggest themselves. The tube could be square in section rather than round. If the tool were constructed of a longitudinally split square tube, the substantial identity of the two sections need not be observed; one section could be a shallow channel or a flat and the section a deep channel. In such case, the provision for the rocking movement, the obtuse angle in the long edges, could be present in the deep channelled member only, the long edges of the shallow member being straight. All of these, however, embody the same basic concept underlying the present invention of forming a tool of separate halves with small tips at one end which are associated together to rock on a transverse axis so that the tips are easily engageable in a sleeve at one position in the rocking movement of the tool parts and in another position, stretch the sleeve to fit it over a shaft and simultaneously define a leading tube for the sleeve about the shaft by which the sleeve may be drawn down over the shaft.

We claim:

1. A two-piece tool for applying an elastic sleeve to a shaft which consists of a pair of separate, unconnected, elongated, channel-shaped members adapted, when placed together, long edges to long edges, to rock with respect to each other on a transverse axis intermediate their length to juxtapose ends of said members at one extreme of said rocking movement, said ends when juxtaposed being proportioned to be insertable into said sleeve, and to define an open tube proportioned to encompass said shaft and to stretch said end of said sleeve to permit the placement thereof about one end of said shaft at another point in said rocking movement, said members including an interengaged notch and protruding bearing on said long edges at each side at said rocking axis when placed together to prevent longitudinal relative displacement as between said members, said bearings being flush with the inside surface of said defined tube, and brackets on one of said members extending from the long edges thereof at said rocking axis spaced to embrace the other of said members to prevent relative lateral displacement from said edges-to-edges relationship.

2. The combination as set forth in claim 1 wherein said long edges of at least one of said members include segments extending from each end of said member to said rocking axis making an obtuse angle with each other.

3. The combination as set forth in claim 2 wherein said members are substantially identical.

4. The combination as set forth in claim 1 wherein said ends adapted for sleeve insertion have re-entrant surfaces adapted to be engaged by the elasticity of said sleeve to grip said sleeve more effectively for tractive effort.

5. The combination as set forth in claim 1 including means on said members at said rocking axis to prevent lateral, angular, and longitudinal misalignment with each other.

6. A two-piece device for applying an elastic sleeve to a shaft which consists of an unconnected pair of members similarly channel-shaped in cross section defining an open tube larger than said shaft when placed together with said channel edges abutting, the longitudinal edges of said members extending parallel to the longitudinal axis of said members from one end thereof to a point intermediate their length and at an angle to intercept the projected back of said members from said point to the other end thereof, defining an obtuse angle between the portions of said longitudinal edges at said point and tips narrower and shallower than said channel section at said other ends, said members having interengageable notches and protruding bearings at the apices of said angles to prevent longitudinal relative displacement as between said members, said bearings being flush with the inside surface of said defined tube, and brackets on one of said members extending from the apices of said angles to embrace the other of said members to maintain laterally said channel-edges-abutting relationship.

7. The combination as set forth in claim 6 wherein said tips include re-entrant surfaces adapted to be engaged by the elasticity of said sleeve when stretched.

* * * * *